June 29, 1937.　　　G. H. HART　　　2,085,217
HEATER CIRCUIT AND CONTROL
Filed Nov. 10, 1934　　　2 Sheets-Sheet 1
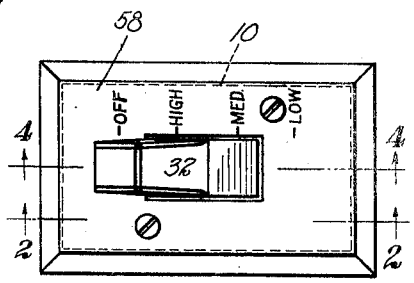
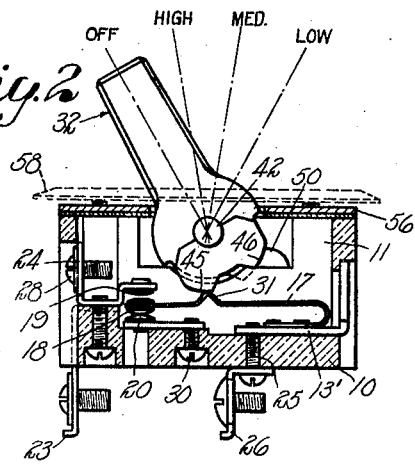
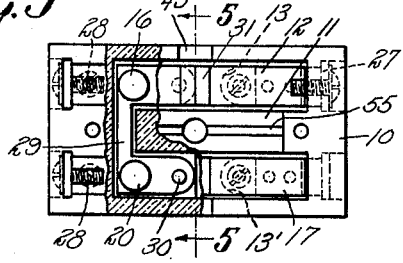
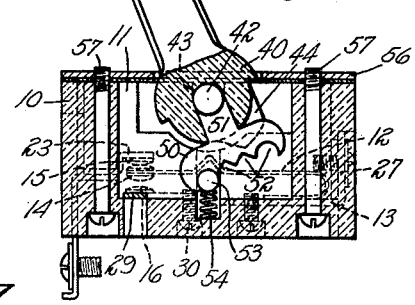
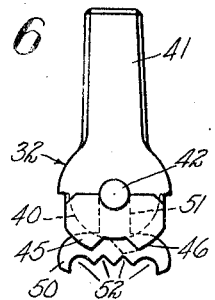
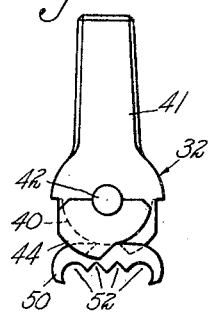
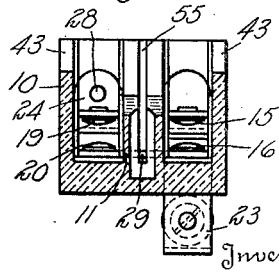
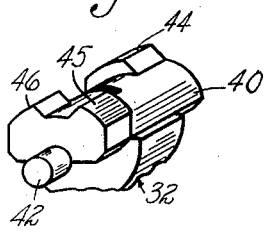
Inventor
George Hegeman Hart
By K. Clay Lindsey
Attorney June 29, 1937.   G. H. HART   2,085,217
HEATER CIRCUIT AND CONTROL
Filed Nov. 10, 1934   2 Sheets-Sheet 2
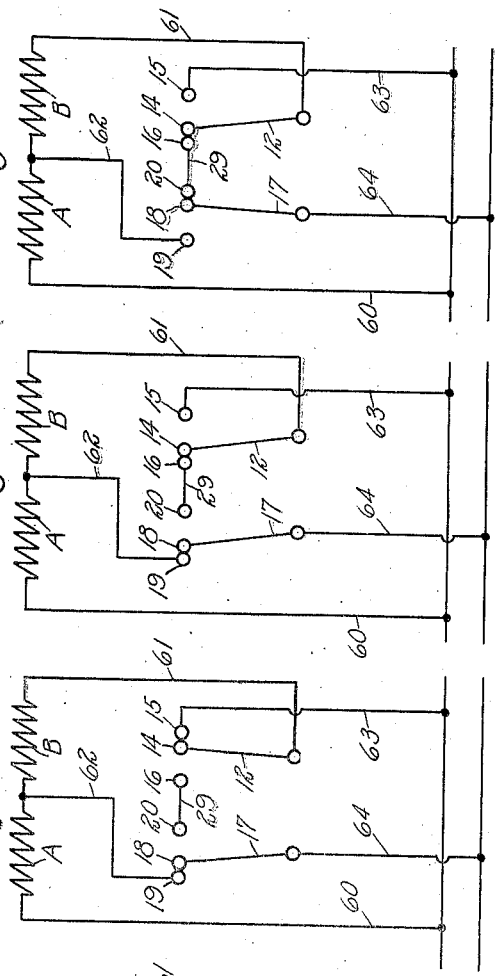
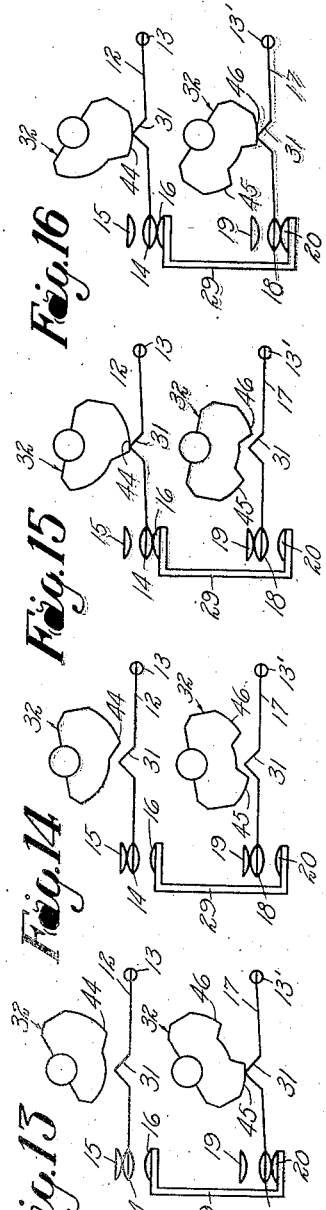

Patented June 29, 1937

2,085,217

UNITED STATES PATENT OFFICE 2,085,217

HEATER CIRCUIT AND CONTROL

George Hegeman Hart, West Hartford, Conn.

Application November 10, 1934, Serial No. 752,503

6 Claims. (Cl. 219—20)

This invention relates to a heat control system which includes a two-part heating element and a switch associated therewith so as to control the current supply thereto from the lines of a system having a neutral wire.

The aim of the invention is to provide an improved arrangement which includes a very simple and effective switch comprising a relatively few number of parts and by means of which the current may be thrown off the heating element and the heating element may be connected to the lines so as to selectively establish circuits for giving high, medium, and low degrees of heating, the various circuits being selectively established without danger of short-circuiting.

A more particular object of the invention is to provide an improved single pole series-parallel switch for controlling the current from two wires of a supply system to a two-part heating element, the switch having but two contact arms or blades each of which is associated with a respective pair of fixed contacts, the switch also having operating means for selectively moving the contact arms in such manner that on no operation of the switch does either of the arms move from a fixed contact connected to one line to a fixed contact connected to the other line, whereby short-circuiting is guarded against.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings is shown, for illustrative purposes, one embodiment which the present invention may take, and in these drawings Fig. 1 is a front view of my improved switch;

Fig. 2 is a sectional view therethrough taken substantially on line 2—2 of Fig. 1;

Fig. 3 is a front view of the switch with the front plates removed and part of the casing in section;

Fig. 4 is a view similar to Fig. 2 but taken on line 4—4 of Fig. 1;

Fig. 5 is a transverse sectional view taken substantially on line 5—5 of Fig. 3;

Fig. 6 is an elevational view looking at one side of the operating member;

Fig. 7 is a similar view looking at the other side of the member;

Fig. 8 is a perspective view looking at the rear or cam end of the operating member;

Figs. 9, 10, 11, and 12 are diagrammatic views illustrating the system in which the switch is incorporated and respectively showing the four positions of the switch and the resultant currents, these figures respectively showing the switch in "off", "high", "medium", and "low" positions; and Figs. 13, 14, 15, and 16 are diagrammatic views corresponding respectively to Figs. 9, 10, 11, and 12 and showing the relation of the cams on the operating member with respect to the contact arms in the several positions of the switch.

Referring to the drawings in detail, 10 designates a base of suitable insulating material, the same being hollowed out to form a chamber, and the chamber being longitudinally divided by a web or partition 11. Located within the casing to one side of the web is a contact arm or blade 12 which, in the present illustrated disclosure, is in the form of a thin resilient strip one end of which is bent back upon itself and anchored by rivets or welding to a supporting strip 13. On the free end of the contact arm 12 is a contact 14 positioned between a pair of fixed contacts 15 and 16 and adapted to alternately engage therewith upon a relatively small movement of the contact arm 12. Positioned within the base to the other side of the web 11 is a second contact arm 17 similar in construction to the contact arm 12. The arm 17 carries, adjacent its free end, a contact 18 positioned between a pair of fixed contacts 19 and 20. The movable contacts 14 and 18 and the fixed contacts 15, 16, 19, and 20 are preferably in the form of buttons of silver or other metal which will not be appreciably damaged by arcing during the making and breaking of the electrical circuits. The contacts 15 and 19 are carried by terminal members 23 and 24 respectively. The supporting strip 13' for the contact arm 17 is connected by a screw 25 to a terminal member 26, and the supporting strip 13 for the other switch arm has an upwardly extending tail piece 27 which constitutes a terminal member. The wires leading from the feed wires or to the heating element may be connected to the terminals by screws 28. The contacts 16 and 20 are carried by a metal bridge member 29 secured in place on the base by screws 30 but having no electrical connection with either the line wires or the heating element, except through the contact arms 12 and 17.

Each of the contact arms is provided between its ends with a hump or bend 31, and there is provided an operating member (designated generally by the numeral 32) having cams adapted to cooperate with these humps or bends. The operating member has a body portion 40 and a handle 41 preferably molded of insulating material in one integral piece. Extending from the opposite ends of the body portion are integral trunnions 42 adapted to seat in notches 43 in the forward edges of the side walls of the base so that the operating member may be rocked to its several positions. Integrally molded on the body portion 40 is a cam 44 adapted to cooperate with the contact arm 12. Also integrally molded on the body portion are two angularly spaced apart cams 45 and 46 adapted to cooperate with the arm 17. The relation of these cams will be understood from the diagrammatic showing in Figs. 13 to 16, inclusive.

The operating member is provided with indexing means for holding it in its several positions. In the present instance, the indexing means comprises a metallic member or plate 50 having a stem 51 anchored in the body portion of the operating member. The rear edge of this plate has four notches 52 adapted to selectively receive a ball 53 behind which is a spring 54. The plate is accommodated by a slot 55 in the previously described web or partition 11. The trunnions of the operating member are held in the seats 43 by a shield or cap plate 56 secured in place by screws 57. Upon this cap plate is a front panel 58 which may bear the indicia "off", "high", "med.", and "low" to indicate the several positions of the switch.

Referring now to the diagrammatic showings in Figs. 9 to 12 inclusive, N and L respectively designate two line wires of an alternate current system, the wire N being the neutral one. While there is shown only two wires, it will be understood that the system may have more than two wires, one of which is neutral, such, for example, as an Edison three-wire system. A and B designate the two parts of the heating unit or element, such as are provided in hot plates, grills, or other heating instrumentalities of an electric range. One end of the heating unit is directly connected to the neutral line N by wire 60, and the other end of the unit is connected by a wire 61 to the contact arm 12. The fixed contact 19 is connected to the intermediate point of the unit by a wire 62, and the contact 15 is connected to the line wire N by a wire 63. The other contact arm 17 is connected to the other line wire L by a wire 64.

The operation is briefly as follows: When the parts are in the "off" position shown in Figs. 9 and 13, the cam 44 is out of engagement with the contact arm 12, and the contact arm 17 is held down by the cam 45 so that the arm 12 engages the contact 15, and the arm 17 engages the contact 20. In this position of the arms, there is no current flowing through either part of the heating unit. When the operating member is thrown from "off" to "high" position, the cam 45 is withdrawn from the arm 17 so that that arm may spring upwardly and thereby engage the contact 19. During such movement, the "up" position of the arm 12 is not disturbed. The two parts of the unit are now connected in parallel and a high heat is obtained. On the next movement of the operating member, that is the movement from "high" to "medium" position, the cam 44 moves the arm 12 from the contact 15 and into engagement with the contact 16, the position of the arm 17 not being disturbed. The current will now flow through that part of the heating unit lettered A. On movement of the operating means to "low" position, the cam 46 moves the arm 17 from engagement with the contact 19 and into engagement with the contact 20 while the cam 44 continues to hold the arm 12 in engagement with the contact 16. Both parts of the heating unit are now connected in series across the lines. On reverse movement of the operating handle, the connections are made in reverse order.

It is clear from the foregoing description, taken in connection with the accompanying drawings, that I have provided a very simple and effective switch comprising a relatively few number of parts which may be economically manufactured and assembled. The contact arms are limited to relatively small movement so that arcing is avoided, or at least reduced to a minimum. When the switch is connected up as shown in Figs. 9 to 12, inclusive, short circuiting due to arcing is prevented for the reason that in no instance are either of the movable contacts moved from a fixed contact connected to one line and into engagement with a fixed contact connected to the other line.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. An electrical circuit comprising two power lines having a switch and an electrically actuated heating element connected thereto, said circuit being arranged to provide for different amounts of heat within the element, two separately movable arms within the switch, one of which is permanently electrically connected to one end of the heater element, the other arm being permanently electrically connected to one of the power lines, the first named arm being selectively engageable with a pair of spaced contacts, one of which is connected to the other power line and also to the other end of the heater element, said second named arm being selectively engageable with a pair of spaced contacts, one of which is connected to a portion of the heater element intermediate of its ends, the other of said spaced contacts being electrically connected together, and means to move the arms of the switch whereby the switch may be arranged to selectively direct electrical power to different portions of the heater element and provide for a plurality of predetermined conditions of heat within said element and an "off" position wherein the electrical power is completely disconnected from the element.

2. An electrical circuit comprising two power lines of an electrical supply system having a switch and a two-part electrically actuated heating element, said switch having two individually movable arms, one of which is electrically connected to an end of the heater element, the other arm being electrically connected to one of the power lines, said first mentioned arm being selectively engageable with a pair of spaced fixed contacts, one of which is connected to the other power line and also to the other end of the heater element, said second arm being selectively engageable with a pair of spaced fixed contacts, one of which is electrically connected to an intermediate portion of the heater element, the other of said two fixed contacts being electrically connected together, and manually operable means which is arranged to selectively shift the arms of the switch and provide for "off", "high", and "low" conditions of heat within the heating element as desired.

3. An electrical circuit comprising two power lines having a switch and a two-part electrically actuated heating element connected thereto, said switch having two separately movable arms, one of which is permanently electrically connected to an end of the heater element, the other movable arm being permanently electrically connected to one of the power lines, said first mentioned arm being selectively engageable with a pair of spaced contacts, one of which is connected to the other power line and to the other end of the heater element, said second mentioned switch arm being selectively engageable with another pair of spaced contacts, one of which is connected to the intermediate portion of the two part heater element, the other two contacts being electrically connected together, and a manually operable switch handle having cams associated therewith which are so arranged that movement of the switch handle to predetermined positions will selectively operate the switch arms and connect various parts of the element to the power lines to provide for "off", "high", and "low" conditions of heat within said element.

4. An electrical circuit including two power lines and a switch for connecting a two-part heating element to said two lines for "off", "high", "medium", and "low" conditions of heat, said switch having two switch arms, one connected to one end of the element and the other connected to one of said lines, said first arm having a pair of fixed contacts with which said arm is adapted to alternately engage, one of said contacts being connected to the other of said lines and to the other end of said element, said second arm having a pair of fixed contacts with which said arm is adapted to alternately engage and one of which is connected to the intermediate portion of said element, the other of said contacts being electrically connected together, and an oscillating operating member having means associated with said arms and arranged so that in the "off" position of the operating member the element connected switch arm is in engagement with its line connected fixed contact, and the line connected arm is out of engagement with its element connected contact; in the "high" position, the element connected contact arm is in engagement with its line connected contact and the line connected contact arm is in engagement with its element connected contact; in the "medium" position, the element connected contact arm is out of engagement with its line connected contact and the line connected contact arm is in engagement with its element connected contact; and in the "low" position, the two contact arms are in engagement with the two fixed contacts which are connected together.

5. In combination with a two-wire power line connected to an electrical supply system, a two-part heating element one end of which is permanently connected to one of said power wires and a switch having two pairs of separate fixed contacts, one contact of one pair being connected to an intermediate portion of said element, one contact of the other pair being connected to the last mentioned power wire, the other two of said fixed contacts being electrically connected together, a switch arm permanently connected to the other end of the heating element and arranged to selectively engage that pair of fixed contacts which includes the one connected to the power wire, a second switch arm permanently connected to the other power wire and arranged to selectively engage with that pair of contacts which includes the one connected to the intermediate portion of the heating element, and manually operable means having cams connected thereto and selectively engageable with said switch arms to individually or simultaneously move said arms into and out of their respective contact positions to establish the following connections in the several positions of the switch:— an "off" position wherein the two parts of the heater element are connected to the same side of the power line and no current flows therethrough; a "high" position wherein the two parts of the element are electrically connected in parallel across the power lines; a "medium" position wherein but one part of the element is connected across the power lines; and a "low" position wherein both parts of said element are electrically connected in series across the power lines.

6. In combination, two lines of a supply system, a two-part heating element one end of which is connected to one of said lines, and a switch having two pairs of fixed contacts, one contact of one pair being connected to the intermediate point of said element and one contact of the other pair being connected to the last mentioned line, the other two of said fixed contacts being electrically connected together, a switch arm connected to the other end of said element and associated with that pair of fixed contacts which includes the one connected to the line, a switch arm connected to the other of said lines and associated with that pair of contacts which includes the one connected to the intermediate point of said element, and operating means for moving said arms to establish the following connections in the several positions of the switch:— the two parts of the element to the same line, the parts of the element in parallel across the lines, one part only of the element across the lines, and the parts of the element in series across the lines.

GEORGE HEGEMAN HART.